(12) United States Patent
Fukuda

(10) Patent No.: US 6,454,040 B1
(45) Date of Patent: *Sep. 24, 2002

(54) TRANSMISSION AND COOLING ARRANGEMENT FOR ALL TERRAIN VEHICLE

(75) Inventor: Kazutaka Fukuda, Iwata (JP)

(73) Assignee: Yamaha Hatsudoki Kabushiki Kaisha (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/290,272

(22) Filed: Apr. 13, 1999

(30) Foreign Application Priority Data

| Apr. 13, 1998 | (JP) | 10-101183 |
| Apr. 28, 1998 | (JP) | 10-118370 |
| Jul. 28, 1998 | (JP) | 10-213343 |

(51) Int. Cl.[7] .................................. B60K 17/00
(52) U.S. Cl. .................... 180/374; 180/68.1; 180/230; 180/297
(58) Field of Search ........................... 180/374, 375, 180/376, 377, 312, 68.1, 248, 230, 291, 292, 297; 74/606; 474/11

(56) References Cited

U.S. PATENT DOCUMENTS

| 2,145,545 A | 1/1939 | Johnson et al. .......... 74/230.17 |
| 2,315,317 A | 3/1943 | Copp et al. .................... 74/219 |
| 2,707,402 A | 5/1955 | Blair ........................ 74/230.01 |
| 2,850,852 A | 9/1958 | Hofberger ..................... 51/135 |
| 3,229,424 A | 1/1966 | Fairchok ...................... 51/148 |
| 3,733,918 A | 5/1973 | Domaas .................... 74/230.17 |
| 3,943,785 A | 3/1976 | Percifield ................. 74/242.12 |
| 4,339,964 A | 7/1982 | Isaka ........................... 74/606 |
| 4,483,686 A | 11/1984 | Kobayashi et al. ........... 474/11 |
| 4,497,285 A | 2/1985 | Kondo .................... 123/41.65 |
| 4,531,928 A | 7/1985 | Ikenoya ........................ 474/93 |
| 4,600,074 A * | 7/1986 | Watanabe et al. ............ 180/251 |
| 4,606,310 A | 8/1986 | Makino ...................... 123/192 |

(List continued on next page.)

FOREIGN PATENT DOCUMENTS

| JP | 59-77924 | 5/1984 |
| JP | 61-89187 | 5/1986 |

*Primary Examiner*—Brian L. Johnson
*Assistant Examiner*—J. Allen Shriver
(74) *Attorney, Agent, or Firm*—Knobbe, Martens, Olson & Bear, LLP

(57) ABSTRACT

An all terrain vehicle has a lubrication system that draws from an oil pan and lubricates the main bearings and the piston. A drive shaft for the vehicle is positioned outside of the oil pan such that the oil pan's lateral dimension may be decreased. Additionally, a lubricant pump pickup is located within a recess in the bottom of the oil pan such that the pick-up is at about the same vertical height as the lower surface of the crankcase. The vehicle is also shiftable from two-wheel drive to four-wheel drive. The shifting mechanism is located within the crankcase or transmission case. A locking collar selectively engages or disengages two of the four wheels from the output.

33 Claims, 12 Drawing Sheets

U.S. PATENT DOCUMENTS

| | | | | |
|---|---|---|---|---|
| 4,620,453 A | * | 11/1986 | Bumazawa | 74/476 |
| 4,650,029 A | | 3/1987 | Foote et al. | 180/248 |
| 4,697,665 A | | 10/1987 | Eastman et al. | 180/230 |
| 4,712,629 A | * | 12/1987 | Takahashi et al. | 180/68.1 |
| 4,735,105 A | * | 4/1988 | Kumazawa | 74/378 |
| 4,736,809 A | | 4/1988 | Kumazawa | 180/75.1 |
| 4,744,432 A | * | 5/1988 | Shibata et al. | 180/68.1 |
| 4,781,258 A | * | 11/1988 | Tamura | 180/68.1 |
| 4,848,503 A | | 7/1989 | Yasui et al. | 180/190 |
| 4,924,961 A | * | 5/1990 | Bernardi | 180/374 |
| 4,974,693 A | | 12/1990 | Nakai et al. | 180/19.3 |
| 5,172,786 A | | 12/1992 | Ishibashi et al. | 180/190 |
| 5,279,381 A | | 1/1994 | Fukuda | 180/190 |
| 5,490,573 A | * | 2/1996 | Hagiwara et al. | 180/68.1 |
| 5,515,940 A | * | 5/1996 | Shichinohe et al. | 180/376 |
| RE35,675 E | * | 12/1997 | Kitada | 180/68.1 |
| 5,699,872 A | * | 12/1997 | Miyakawa et al. | 180/291 |
| 6,076,624 A | * | 6/2000 | Izumi et al. | 180/291 |
| 6,155,371 A | * | 12/2000 | Izumi | 180/292 |
| 6,170,597 B1 | * | 1/2001 | Fukuda | 180/292 |
| 6,269,899 B1 | * | 8/2001 | Izumi | 180/233 |
| 2002/0043412 A1 | * | 4/2002 | Fukuda | 180/68.1 |

* cited by examiner

TRANSMISSION AND COOLING ARRANGEMENT FOR ALL TERRAIN VEHICLE

BACKGROUND OF THE INVENTION

1. Field of the Invention

The present invention generally relates to a transmission and lubrication arrangement for all terrain vehicles. More particularly, the present invention relates to reducing all terrain vehicle engine size through improved lubrication and transmission units.

2. Related Art

All terrain vehicles are often operated in open terrain under difficult running conditions. While such vehicles often may have unrestricted size, it is desirable to decrease the size and weight of the vehicle. For instance, a smaller vehicle allows its operator to maneuver into locations previously unreachable by the larger vehicles. Moreover, decreasing the size and weight of the vehicle increases the power to weight ratio of the vehicle as well as increases the fuel economy of the vehicle.

In the past, in some all terrain vehicles, the selectively engageable two-wheel drive to four-wheel drive transmissions were positioned such that the shifting was done at the differential units, specifically at the front differential unit. Because the differential unit had to have an increased size for such shifting, the weight distribution of the vehicle was shifted toward the front wheels. Additionally, the frame had to be structured to support the increased weight.

In such vehicles, a lubrication system was also disposed within a portion of the crankcase. The system provided moving components within the crankcase with lubricant through passageways and the lubricant would return to an oil pan under the force of gravity. In such systems, the oil pan may encase a portion of the drive shaft. Because of the increased width of the oil pan required to accommodate the drive shaft, the lubricant within the oil pan was capable of sloshing due to the rough terrain over which the all terrain vehicle traveled. The sloshing resulting in widely varying lubricant levels within the lubrication system. Sometimes the level would drop below the level of a lubricant pump pickup positioned within the oil pan. Moreover, the rotation of the portion of the drive shaft positioned within the oil pan sometimes caused an entrainment of air within the oil supply. In both such instances, the lubricant pump would disadvantageously draw air through the system rather than lubricant.

SUMMARY OF THE INVENTION

Accordingly, one feature of the present invention involves a shiftable transmission designed to centralize a mass associated with the transmission capable of selective two-wheel drive or four-wheel drive. Another feature of the present invention involves a crankcase design and lubrication system capable of reducing the lateral dimension of the oil pan such that lubricant sloshing does not degrade lubricant system performance.

Therefore, one aspect of the present invention involves an all terrain vehicle comprising an engine, a front wheel and a rear wheel. The engine has a generally laterally extending crankshaft with a crankcase enclosing the crankshaft. A v-belt transmission is coupled to the crankshaft and generally comprises a driven pulley, a drive pulley and a belt extending between the driven pulley and the drive pulley. A generally vertical wall divides the crankcase into an auxiliary chamber and a crank chamber. The v-belt transmission is positioned at least partially within the auxiliary chamber while a lubricant pump is positioned within the crank chamber. The v-belt transmission is generally positioned vertically above, and is connected to, a drive shaft that extends longitudinally within the auxiliary chamber of the crankcase.

Another aspect of the present invention involves an all terrain vehicle comprising a frame, an engine, at least one front wheel and at least one rear wheel attached to the frame. The engine has a generally laterally extending crankshaft with a crankcase enclosing the crankshaft. A generally vertical wall divides the crankcase into an auxiliary chamber and a crank chamber. A gear box is defined within a portion of the auxiliary chamber. A lubricant pump is positioned within the crank chamber while a drive shaft extends longitudinally within the auxiliary chamber of the crankcase. A shaft drive mechanism comprises an input shaft connected to the crankshaft and an output shaft extending from within the crank chamber into the gear box. A first drive shaft is coupled to the output shaft and a second drive shaft is selectively coupleable to the drive shaft. A shiftable coupling mechanism positioned between the second drive shaft and the output shaft and located at least partially within the crankcase. The coupling mechanism is capable of shifting to drive one of the front wheel or the rear wheel or to drive both the front wheel and the rear wheel.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which drawings.

DETAILED DESCRIPTION OF THE PREFERRED EMBODIMENT OF THE INVENTION

Figure 1:
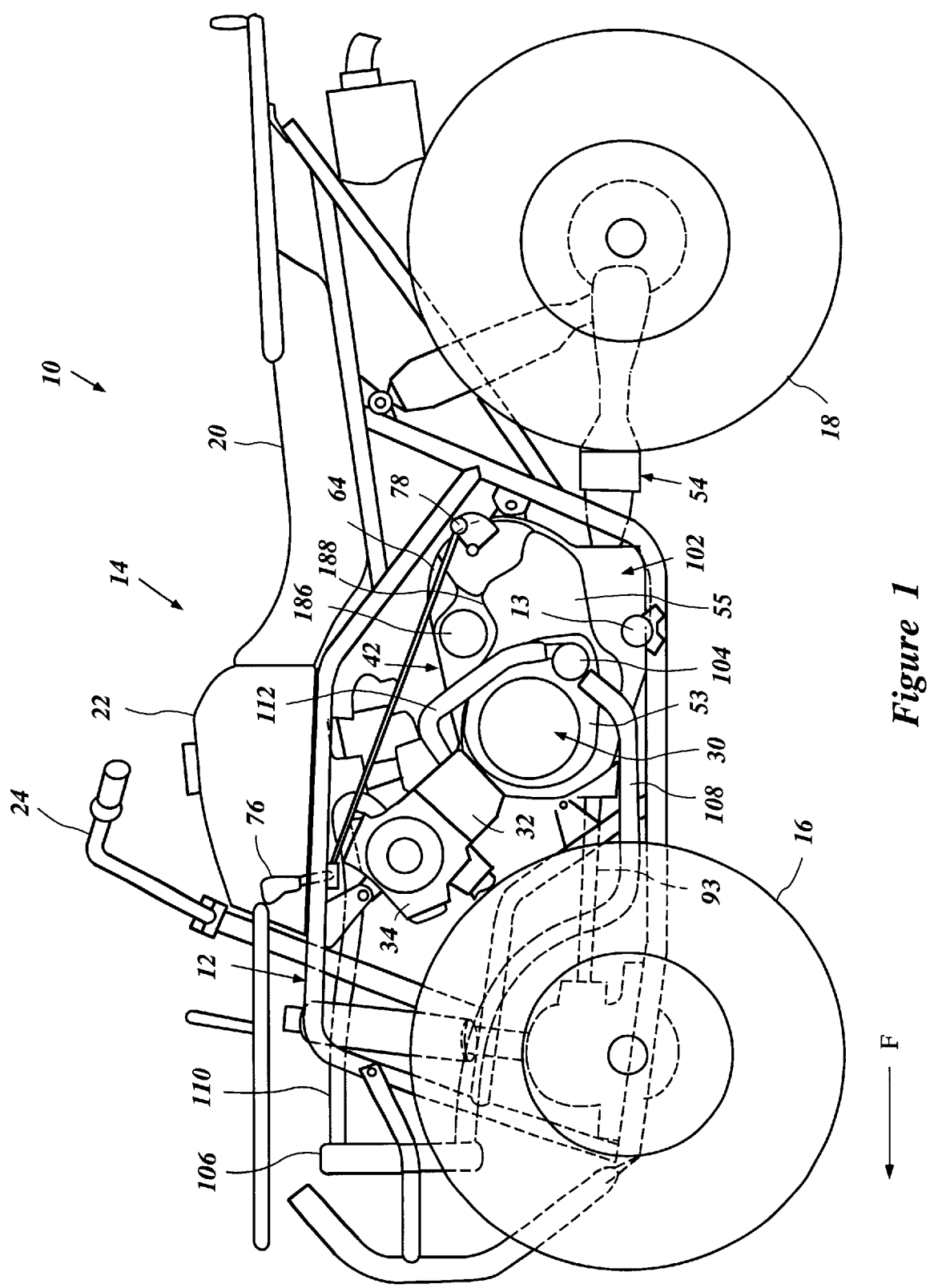
FIG. 1 is a side view of an all terrain vehicle arranged and configured in accordance with certain features, aspects and advantages of the present invention and having some internal components illustrated with hidden lines.

With reference initially to FIG. 1, an all terrain vehicle configured and arranged in accordance with certain features, aspects and advantages of the present invention will be described in detail. The illustrated vehicle, indicated generally by the reference numeral 10, provides an exemplary environment in which the present transmission and cooling arrangement will be described. While the vehicle 10 is a small stature, four wheel, all terrain vehicle, one of ordinary skill in the art will readily recognize that the present cooling system may find utility in a variety of other land-based vehicles as well.

With continued reference to FIG. 1, the vehicle 10 is generally comprised of a frame 12, a body 14, a pair of front wheels 16 and a pair of rear wheels 18 assembled in any suitable manner. The frame 12 is typically of a welded construction and generally defines, in part, a centrally located engine compartment. A foot peg 13 or other footboard structure may be attached to the frame in any suitable manner.

The illustrated frame also carries several components that, together, form the body 14. For instance, a seat 20 is carried atop a rear portion of the frame 12. A fuel tank 22 is typically secured to the frame 12 forward of the seat 20. Moreover, a steering handle assembly 24 is connected to the front wheels 16 in any suitable manner and extends upward through the frame 12 to a location generally above a forward portion of the fuel tank 22. As will be recognized, gauges, which may transmit information relating to operating conditions of the vehicle 10, may be arranged proximate the steering handle assembly 24. As each of these components and the methods related to their manufacture and assembly are considered to be well known to those of ordinary skill in the art, further description is deemed unnecessary.

An internal combustion engine 30 is mounted to the frame 12 within the engine compartment in any suitable manner. In the illustrated embodiment, the engine 30 comprises a one-cylinder, two-cycle construction. It should be appreciated that the engine 30 could also have two or more cylinders and could operate on any known operating principle, such as a four-cycle principle.

The engine 30 generally comprises a cylinder block 32. The cylinder block 32 preferably contains at least one cylinder bore (not shown) which may be inclined along an axis that is skewed relative to a vertically extending axis. Such a configuration allows for a reduced vertical dimension to the overall engine envelope and, therefore, creates a more compact engine arrangement and a reduced vehicle size and weight. A cylinder head assembly 34 may be attached to the cylinder block 32 covering an end of the cylinder bore. The cylinder head assembly 34 preferably features a recess which cooperates with the cylinder bore and a top surface of a piston (not shown) to define a combustion chamber within the cylinder. The cylinder head assembly 34 is attached to the illustrated cylinder block 32 through the use of a set of threaded fasteners 35 (see FIG. 3) but may be attached in any other suitable manner.

Figure 2:
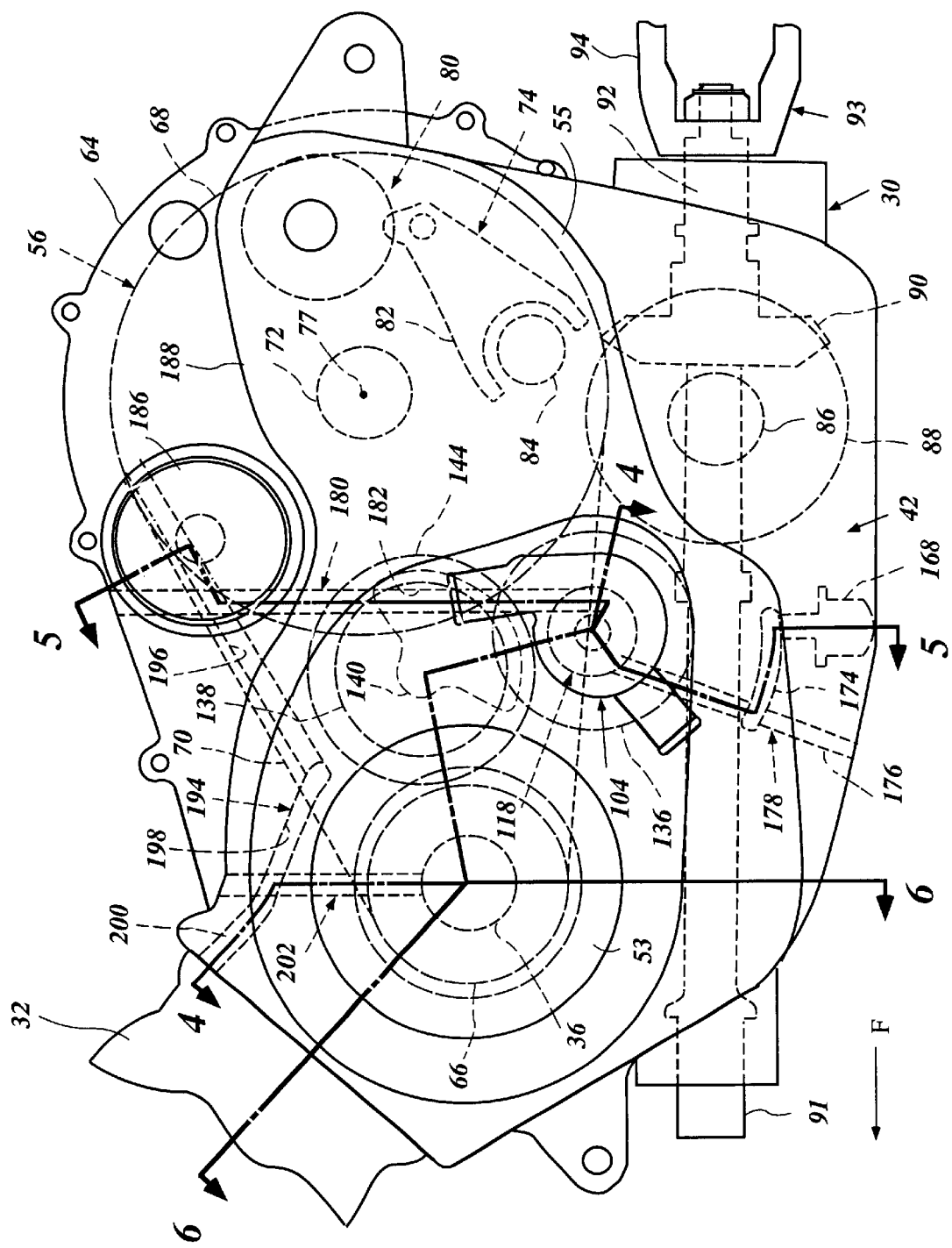
FIG. 2 is an enlarged side view of a portion of a crankcase and a transfer case of the all terrain vehicle of FIG. 1 with some internal components illustrated with hidden lines.
Figure 3:
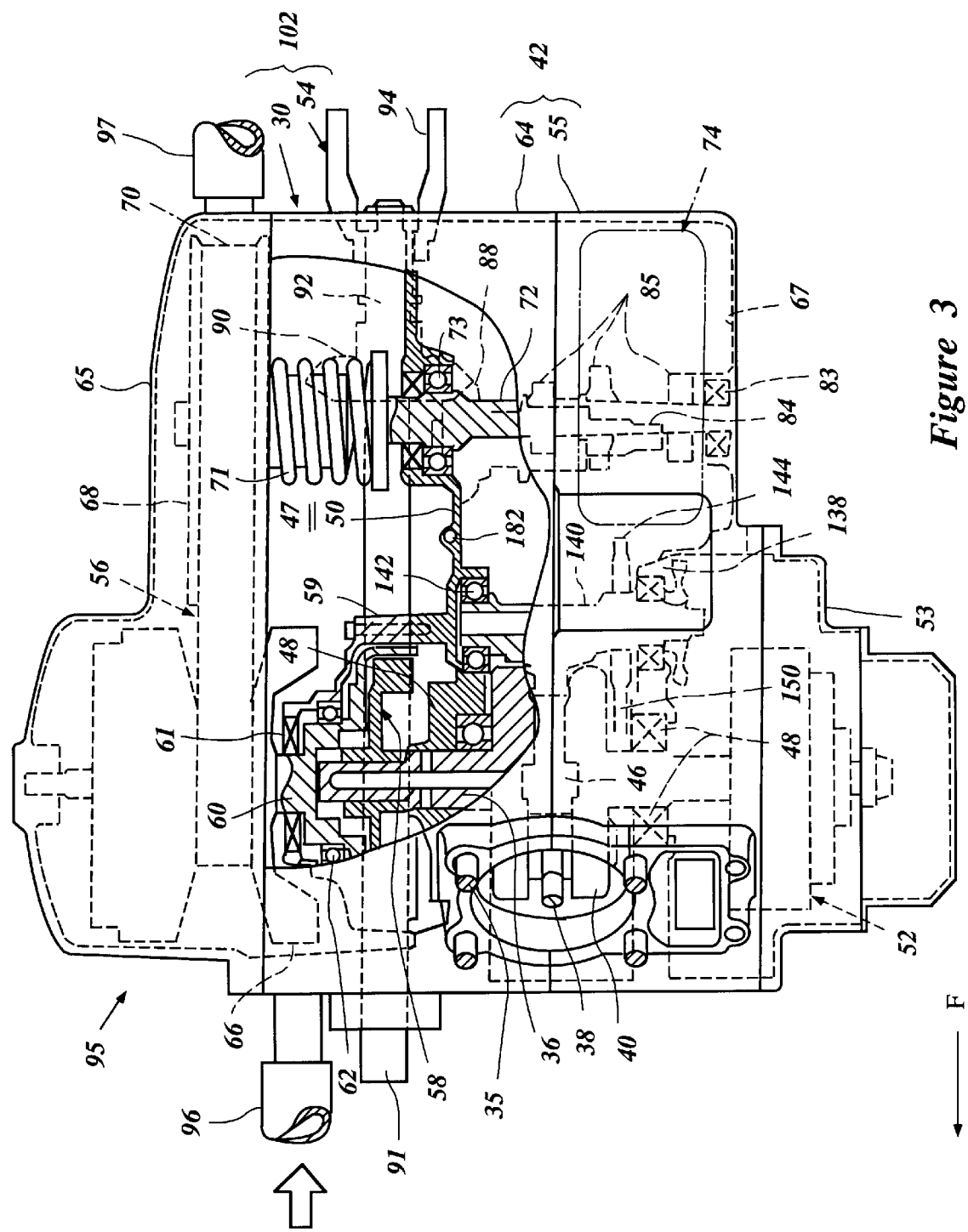
FIG. 3 is a partially sectioned top view of the crankcase and the transfer case of FIG. 2 with some internal components illustrated with hidden lines.

With reference to FIG. 2, the piston (not shown) reciprocates within the cylinder bore (not shown) and is connected to a crankshaft 36 via a connecting rod 38 (see FIG. 3). With reference to FIG. 3, the connecting rod 38 is preferably connected to a throw 40 of the crankshaft 36 such that, as the piston (not shown) completes a full translating cycle, the crankshaft 36 may complete a full revolution. A counterweight portion 41 of the crankshaft 36 preferably extends from the opposing side of the crankshaft 36 relative to the throw 40. The linkage between the piston (not shown) and the crankshaft 36, therefore, transposes the piston's reciprocal translating motion into a rotational output while the counterweight portion helps to balance the rotation of the crankshaft 36.

The crankshaft 36, as illustrated in FIG. 3, is substantially restrained for rotational movement within a crankcase 42. As such, the crankcase 42 generally defines, among other chambers, a crank chamber 46. In the illustrated embodiment, a set of bearings 48 journal the crankshaft 36 for rotation within the crank chamber 46. The bearings 48 are set within a substantially vertically extending wall 50 which, in part, defines a single cell of the crank chamber 46 that corresponds to the cylinder. In multiple cylinder embodiments, a plurality of such walls may segregate the crank chamber 46 into several cells such that one cell would correspond to one cylinder. Notably, the wall 50 generally divides the illustrated crankcase into a crank chamber 46 and an auxiliary chamber 47. Moreover, the illustrated crankcase 42 is split into two portions 55, 64, which are a left portion 55 and a right portion 64 in the illustrated arrangement.

A flywheel magneto 52 is connected to one end of the illustrated crankshaft 36. As is known, the flywheel magneto 52 rotates with the crankshaft 36 and may be used to sense the engine speed. Additionally, the flywheel magneto may function as an electrical generator in some embodiments. As illustrated in FIG. 3, the flywheel magneto 52 is contained, in part, within a flywheel cover 53 that is attached to the crankcase portion 55 in any suitable manner. As the flywheel magneto 52 is relatively unimportant to the present engine and transmission arrangement, further description of the flywheel magneto 52 is deemed unnecessary.

With continued reference to FIG. 3, the rotational power of the illustrated crankshaft 36 is transferred to at least one drive line 54 (see FIG. 1) through a variable speed belt-drive transmission 56. In the illustrated embodiment, the drive line 54 is preferably a pair of final output shafts, which will be discussed in more detail below; however, as will be recognized by those of ordinary skill in the art, the drive line 54 may also comprise chain drives, geared drives or any other suitable drive arrangement. As illustrated in FIG. 3, the driveline 54 extends substantially normal to the crankshaft 36. Accordingly, a transfer gearing arrangement, discussed below, is provided within a gearbox formed within the illustrated auxiliary chamber 47 to transfer the power from a laterally extending crankshaft 36 to the longitudinally extending drive line 54.

In the illustrated embodiment, a centrifugal clutch 58 connects the crankshaft 36, which extends through the wall 50, and a transmission input shaft 60. The centrifugal clutch 58, as is well known, automatically disengages the transmission input shaft 60 from the crankshaft 36 when the engine speed falls below a predetermined speed and re-engages the two shafts 36, 60 when the engine speed exceeds the predetermined speed. The clutch 58 includes a bearing supporting wall 59 that encases at least a portion of the moving components of the clutch 58 and housings a set of bearings 62, which are described directly below. The walls 50, 59 in the illustrated embodiment form, in part, a clutch chamber which is generally isolated from the crank chamber 46 and the auxiliary chamber 47.

The transmission input shaft 60, as illustrated, extends through the wall 59 and is preferably journaled for rotation by the set of bearings 62. Additionally, a seal 61 is positioned around the transmission input shaft 60 to seal the crankcase chamber 46 from a transmission case defined, in part, by a transmission cover 65 in the illustrated embodiment. As illustrated, the transmission case, or auxiliary case 47, is preferably formed within a portion of the crankcase and enclosed by the transmission cover 65.

Figure 6:
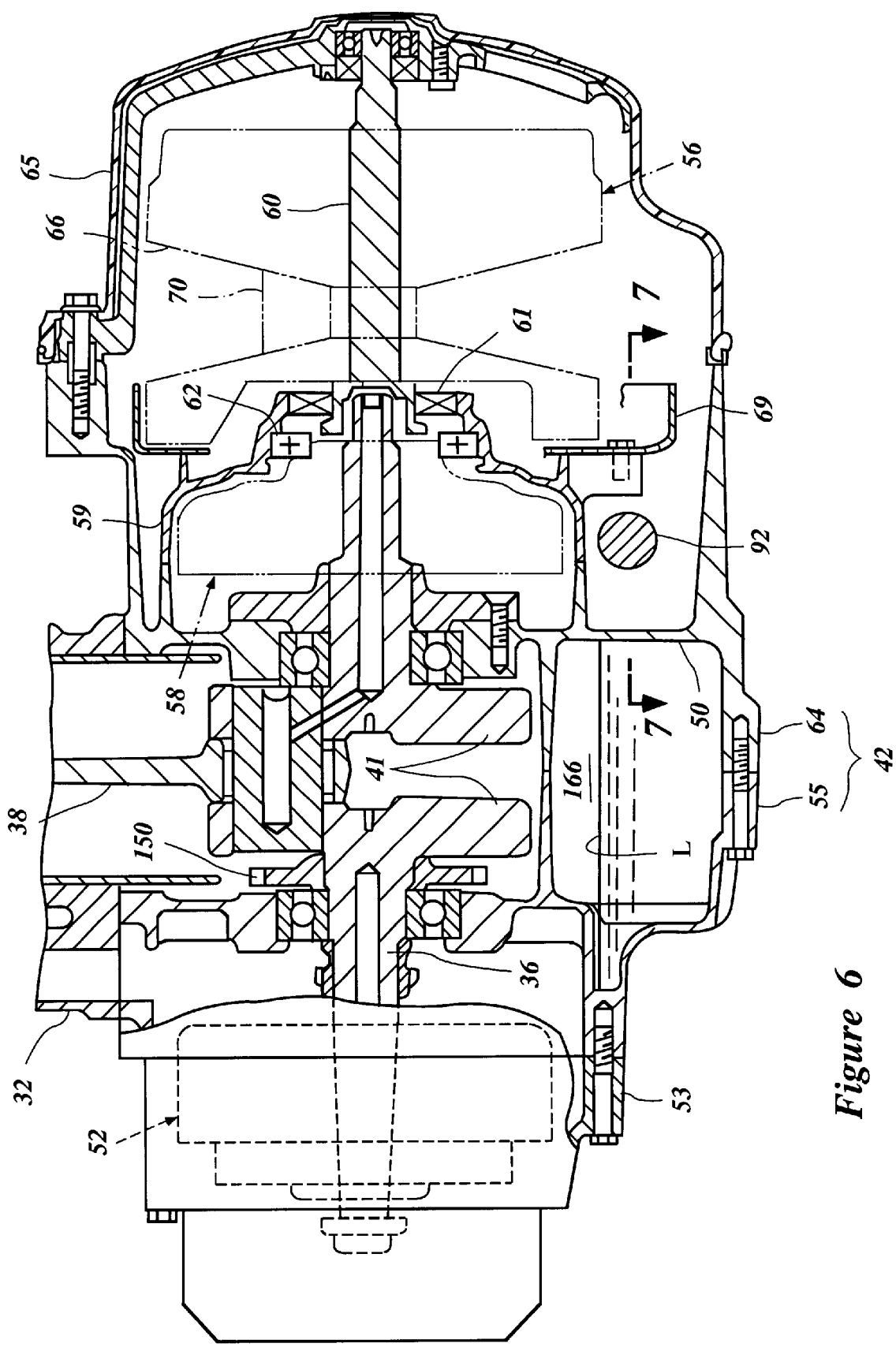
FIG. 6 is a partially sectioned rear view of the engine of FIG. 2 taken along the line 6—6 with some internal components illustrated with hidden lines.

A drive v-belt pulley 66 is preferably connected to the transmission input shaft 60 with splines such that the drive pulley 66 is coupled for rotation with the transmission input shaft 60. As is known, the drive pulley is designed to expand or contract due to increases and decreases in engine speed, thereby altering as the engine speed, or the transmission input shaft speed, changes. A driven pulley 68 is coupled to the drive pulley 66 with a drive belt 70. The driven pulley may also be configured to change in effective diameter. For instance, in the illustrated embodiment, sheaves forming the driven pulley 68 are forced together by a biasing member, such as, for example, a spring 71. In this manner, the driven pulley's size can vary in relation to the changes in the drive pulley's size. With reference to FIG. 6, the v-belt transmission 56 also may include a shroud 69 that is designed to encase at least a portion of the moving components forming the transmission 56.

With reference now to FIG. 2, the driven pulley 68 is coupled to a transmission output shaft 72. The transmission output shaft 72 extends into the crank chamber 46 through the wall 50. A set of bearings 73, desirably positioned within the opening in the wall and backed by a seal, journal the transmission output shaft 72 for rotational motion within the crankcase 42.

The illustrated transmission output shaft 72 is preferably engaged with a shiftable transmission 74, mainly contained within the crank chamber, such that at least a high-speed range and a low-speed range can be selectively engaged. In the illustrated embodiment, the shiftable transmission 74 also includes a parking position, a neutral position and a reverse position.

With now reference to FIG. 1, a shift controller 76 is preferably positioned within easy reach of an operator. In one embodiment, the shift controller 76 may be positioned in a protected region of the vehicle body to one side of the operator. In the illustrated embodiment, the shift controller 76 may be positioned proximate the fuel tank 22 and the steering arrangement 24.

In the illustrated embodiment, the shift controller 76 is connected to a shiftable gearing arrangement within the transfer case via a shift linkage 78. With initial reference to FIGS. 1 and 2, as the shift linkage 78 is pivoted, a shifting drum 80 is rotated. As the shifting drum 80 is rotated, a follower arm of a shifting fork arrangement 82 is moved laterally. Specifically, the shifting drum 80 includes a helical groove in some embodiments. The follower arm is engaged with the helical groove such that as the shifting drum 80 rotates about its axis, the follower arm, and the balance of the shifting fork arrangement, translates along the path substantially parallel to the axis. The shifting fork arrangement then selectively engages or disengages a gearing arrangement carried on a secondary transfer shaft 84 with the transmission output shaft 72 to control whether the vehicle is in a high-speed or low-speed gearing arrangement.

With reference now to FIG. 3, three gears 85 are carried on the illustrated transmission output shaft 72. A set of bearings 83 positioned within a wall 67 of the crankcase cover 64 journal the transmission output shaft 72 for rotational motion about a substantially lateral axis 77. The three gears 85 of the transmission output shaft 72 are selectively coupled to a complementary set of gears on the secondary transfer shaft 84 to control the gear ratio through which the engine power is transmitted to the drive line 54.

In the illustrated embodiment, a gearing arrangement on the secondary transfer shaft 84 transfers the rotational power to a third transfer shaft 86 (see FIG. 2) carried within the transfer case in a location generally vertically below the secondary transfer shaft 84. A gear (not shown) positioned in a middle-position on the illustrated secondary transfer shaft 84, and splined thereto, is engaged with a similarly situated gear on the third transfer shaft 86 such that the third transfer shaft 86 is always driven by the movement of the secondary transfer shaft 84. The illustrated third transfer shaft extends from within the crank chamber 46 into the auxiliary chamber 47 through an opening in the wall 50. Notably, the opening carries a set of bearings and a seal.

An input bevel gear 88 is splined to the end of the third transfer shaft 86 extending into the auxiliary chamber 47, an particularly, into a gear box 89 formed within the auxiliary chamber 47, and engages with an output bevel gear 90 of a final output shaft 92. The output bevel gear, as illustrated, is splined to the final output shaft 92 that may drive the rear wheels, the front wheels, or both selectively or constantly. As also illustrated, the final output shaft 92 carries a coupling 93 comprising at least one universal joint 94 to allow the final output shaft 92 to be coupled to the driveline 54. The engine may also have a forward final output shaft 91 as illustrated in FIG. 2, which is either a dedicated drive line or a selectively engageable drive line.

With reference to FIG. 3, the engine 30 also includes a transmission cooling system 95. As illustrated, ambient air is circulated into the transmission case 65 through an air inlet duct 96, circulated about to cool the belt drive, and exhausted through an air outlet duct 97. In the illustrated embodiment, the inlet duct 96 is positioned on a forward wall of the crankcase cover 64 while the outlet duct is positioned on a rearward wall of the transmission cover 65. In this manner, air flow is ushered from front to rear through the auxiliary chamber 47.

Figure 4:
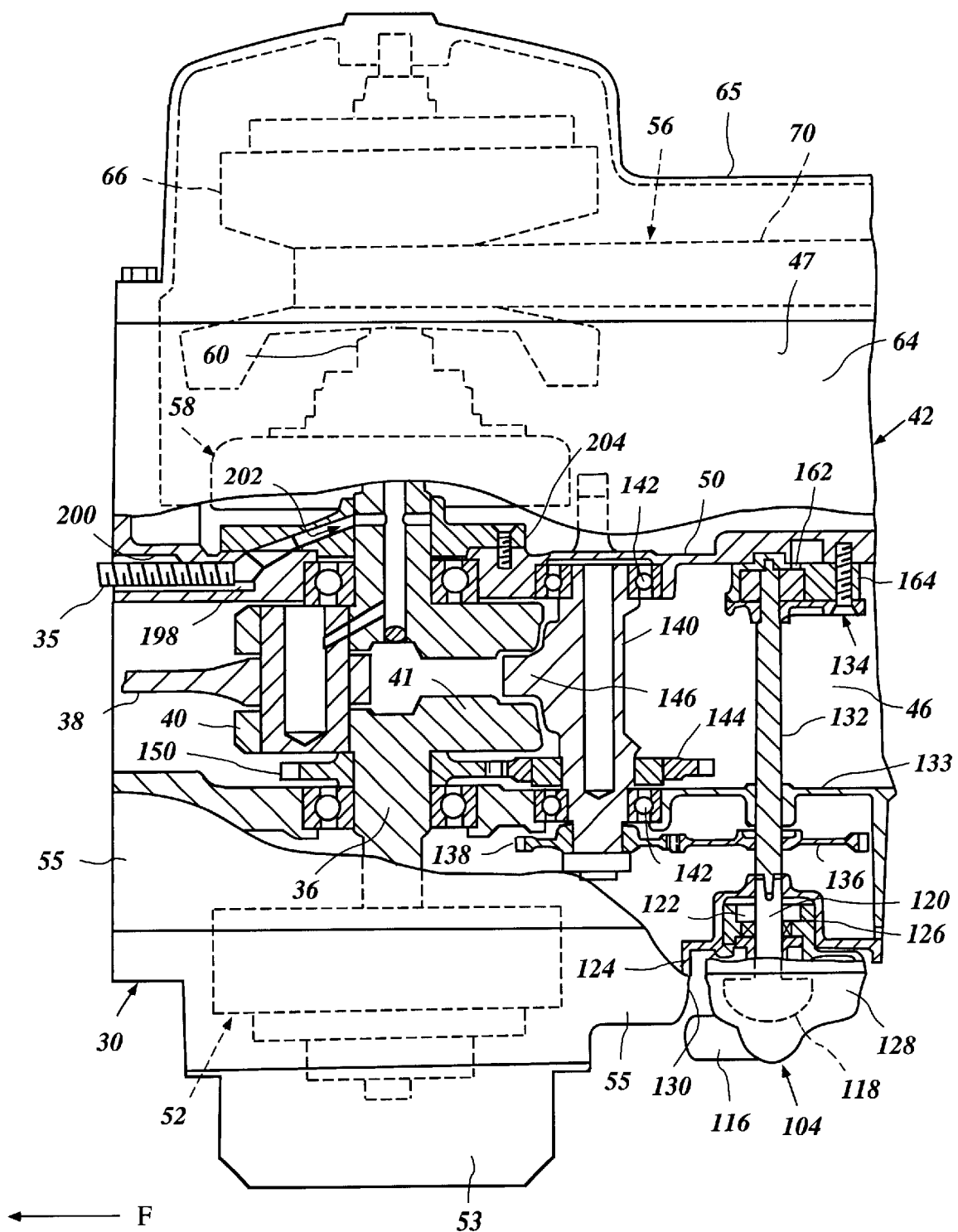
FIG. 4 is a partially sectioned top view of the engine of FIG. 2 taken along the line 4—4 with some internal components illustrated with hidden lines.

With reference now to FIGS. 1 and 4, the illustrated vehicle 10 also carries an engine cooling system, which is designed to cool at least a portion of a drive unit 102 of the vehicle. The cooling system generally comprises a coolant pump unit 104 and a radiator unit 106 that are connected via tubing and passageways extending through the drive unit 102. With reference to FIG. 1, in the illustrated embodiment, a first transfer line 108 extends between the pump unit 104 and the radiator 106 and carries heated coolant from the pump unit 104 to the radiator 106. The heated coolant then passes through the finned structure of the radiator 106 and is cooled by heat transfer that occurs within the radiator 106. The coolant is then cycled to cooling passages of the engine and transmission (not shown) through a return transfer line 110 that is connected to the cylinder head assembly 34 in the illustrated embodiment. The coolant flows through the cylinder head assembly and the cylinder block 32 in any suitable manner and is returned to the coolant pump 104 through a pump supply line 112. The transfer and supply lines 108, 110, 112 may be connected to the radiator 106, the pump 104 and the engine 30 in any suitable manner. For instance, standard pipe clamps may be used to clamp the lines to male extensions from the respective cooling system components.

With reference now to FIGS. 2 through 4, a pump drive mechanism will be described in detail. As illustrated best in FIG. 2, the coolant pump 104 is desirably positioned between the crankshaft 36 and the output shaft 72 of the transmission 56. Moreover, the coolant pump drive mechanism of the illustrated embodiment is positioned forward of and above the drive train extending between the v-belt transmission 56 and the drivelines 54. In this position, the coolant pump drive mechanism does not interfere with the transmission and the pump 104 and its drive mechanism may be tucked within the crankcase 42 or transfer case without extending substantially outward from the side of the vehicle 10. This configuration, therefore, enables the lateral dimension of the drive unit 102 to be decreased over other constructions while allowing easy access for maintenance. For instance, as illustrated in FIG. 4, the coolant pump 104 is positioned so that its outermost portion does not extend as far outward as an outermost portion of the flywheel cover 53. In this position, the coolant pump 104 is also substantially protected from physical contact with brush and debris commonly encountered when operating an all terrain vehicle. Moreover, the coolant pump 104 is advantageously positioned to decrease its impedance into a foot or leg area of the operator or rider. For instance, as illustrated in FIG. 1, the foot peg 13 is positioned slightly rearward of the coolant pump 104 along a longitudinal axis. Accordingly, the bent leg of an operator is likely to extend forward to at least the location of the coolant pump 104 and, if the coolant pump 104 protruded outward to a sufficient degree, the coolant pump 104 may interfere with a comfortable riding position for a rider on a compact vehicle 10.

With reference to FIG. 4, the coolant pump 104 is preferably a gear pump and includes an inlet 114 and an outlet 116. An impeller 118 is positioned within the pump 104 and is preferably interposed between the inlet 114 and the outlet 116. As illustrated, the pump inlet 114 extends downward into the body of the pump 104 and the pump outlet 116 also extends downward away from the body of the pump 104. As is known, as the impeller 118 is rotated, coolant is forced from the inlet 114 to the outlet 116 and a coolant flow is established.

The impeller 118 is positioned at one end of an impeller drive shaft 120, as illustrated in FIG. 3. With reference to FIG. 4, the impeller drive shaft 120 extends substantially laterally within the crankcase 42 and substantially parallel to the crankshaft 36. As illustrated, a set of ball bearings 122 journal the impeller shaft 120 for rotation. The bearings 122 are positioned proximate the impeller 118 and the opposing end of the shaft 120 in one embodiment. In the illustrated embodiment, the impeller shaft 120 extends through a bushing 124 and a seal 126 prior to extending through the bearing 122. The bushing, bearing and seal are positioned within a pump housing 128. The pump housing 128 is preferably designed to fit within a recess 130 of the cover 55 such that the lateral protrusion of the pump housing 128 may be decreased.

The impeller shaft 120 is coupled to a transfer shaft 132 in any suitable manner. As illustrated, the transfer shaft 132 also drives an oil pump 134, described in detail below. The transfer shaft 132 extends through a generally vertical wall 133 in the crankcase 42.

A gear 136 is splined to the transfer shaft 132 such that rotation of the gear 136 can be transferred to the transfer shaft 132 and, ultimately, to the oil pump 134 and the impeller shaft 120.

The transfer gear 136 engages with a second gear 138 that is coupled to a balancer shaft 140. As illustrated, the transfer gear 136 is desirably of a larger diameter than the second gear 138. In this manner, the rotational speed of the balancer shaft 140 can be reduced to a lower speed for the coolant pump 104 and the oil pump 134.

A set of ball bearings 142 journal the illustrated balancer shaft 140 for rotation within the crankcase 42. The bearings 142 in the illustrated embodiment are positioned at one end of the shaft 140 and are interposed between the second gear 138 and a third gear 144 at the other end of the shaft 140. The bearings 142 at the first end of the shaft 140 are carried within the wall 50 while the other bearings 142 are carried within the wall 133.

Interposed between a third gear 144 and the first end of the shaft 140 is an asymmetrically increased cross-sectional portion, or balancer portion, 146 of the shaft that acts to counterbalance the motion of the piston and crankshaft 36. In this manner, the motion of the single cylinder can be countered by the rotation of the balancer shaft 140. While it is possible to increase the opposing side of the crankshaft 36 to counter the motion of the piston, utilizing the balancer shaft 140 in the illustrated embodiment allows the crankshaft 36 to have a smaller effective diameter. Moreover, utilizing the balancer shaft 140 to power the coolant pump 104 leads to a synergistic reduction in engine size. Note that the balancer portion 146 is sized and configured to pass through the increased diameter, or counterweight portion 41, of the illustrated crankshaft 36.

The third gear 144 engages with, and is constantly driven by a driving gear 150, which is splined to the crankshaft 36 in the illustrated embodiment. The third gear 144 and the driving gear 150 are preferably of substantially the same size and configuration to allow the balancer shaft 140 to rotate at substantially the same speed as the crankshaft 36.

Accordingly, the crankshaft 36 is rotatably driven by the pistons of the engine 30 in a known manner. The crankshaft 36 powers the balancer shaft 140 through a gear train. Preferably, the rotational speed of the crankshaft 36 and the balancer shaft 140 are approximately the same. The balancer shaft, in turn, powers the transfer shaft 132 through a second gear train. Preferably, the second gear train steps down the rotational speed from the balancer shaft 140 to the transfer shaft 132. The transfer shaft, in turn, rotatably powers the oil pump 134 and the coolant pump 104.

Figure 5:
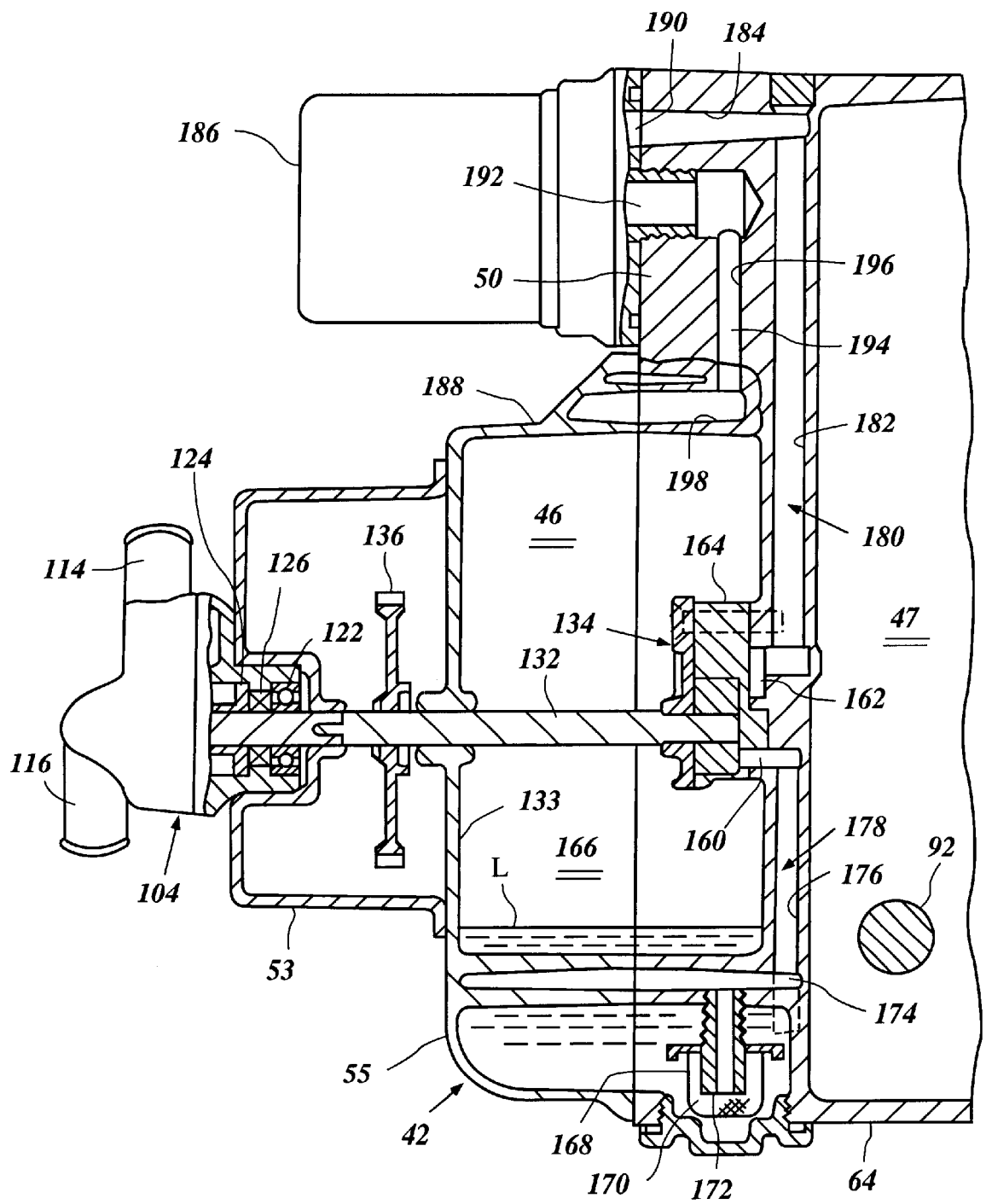
FIG. 5 is a partially sectioned rear view of the engine of FIG. 2 taken along the line 5—5.

With primary reference now to FIGS. 4 and 7, a lubrication system for the engine 30 will be described in detail. As mentioned above, the lubricant pump 134 is driven from the balancer shaft 140 through a transfer shaft 132 and gearing arrangement described in detail above. The oil pump 134 is preferably a gear pump. With reference to FIG. 5, the oil pump 134 features a pump inlet passage 160 and a pump outlet passage 162 and is positioned along the generally vertical dividing wall 50. As the transfer shaft 132 rotates, a gear is driven within a pump housing 164 such that lubricant is carried from the inlet 160 to the outlet 162. This movement of lubricant establishes a generally upward flow within the lubrication system.

With reference to FIGS. 5 and 6, lubricant is drawn from within a lubricant pan 166 upward to the oil pump 134 for dispersal to the balance of the lubricating system. The lubricant is drawn from within a lower portion of the crankcase 42 through a screened pickup 168. In the illustrated embodiment, the pick-up 168 generally comprises a wire mesh 170 that substantially encases an inlet 172 to remove foreign particles from the lubricant prior to circulation within the system. Note that the illustrated inlet 172 is positioned at approximately the same vertical height as a lower surface of the oil pan 166 and that the strainer 170 is positioned within a recess into which an oil drain plug is positioned. In this manner, the inlet is positioned in the lower position portion of the oil pan 166 to assist in maintaining the lubricant level L above the inlet 172 under most operating conditions.

In the illustrated embodiment, the inlet 172 extends substantially vertically to a substantially horizontal extension passage 174. The illustrated horizontal extension passage 174 extends horizontally towards a center of the engine 30 and meets with a substantially vertical extension passage 176 formed within or adjacent to the wall 50. Together the horizontal passage 174 and the vertical passage 176 form, at least in part, the illustrated inlet conduit 178. The inlet conduit is connected to the inlet passage 160 of the oil pump 134 and supplies the lubricant to the pump 134.

A delivery conduit 180 extends away from the pump 134 and supplies a plurality of lubricant galleries through which the lubricant is carried to moving components as will be described below. With reference to FIG. 5, the lubricant passes through a first delivery passage 182, which extends generally upward and slightly rearward within the crankcase 42 in the illustrated embodiment. The first passage 182 joins a second delivery passage 184 that extends generally laterally to an oil filter 186 in the illustrated embodiment. Again, the delivery passage 182 extends, at least in part, within or substantially adjacent to the wall.

The oil filter 186 of the illustrated embodiment is desirably positioned within a recess in an upper edge 188 of the cover 55. In this manner, the lateral protrusion of the oil filter may be reduced. Additionally, while positioned for protection, the oil filter is easily accessed for routine maintenance. Moreover, the lubricant travel path length may be reduced through such placement. The second passage 184 preferably mates with a filter inlet 190 such that the lubricant may pass into the filter 186 uninhibited.

The lubricant flows through the filter 186 and exits the filter through an outlet 192. As illustrated, the outlet 192 is generally centrally disposed within the oil filter 186 and returns the lubricant to the crankcase 42 in substantially the same longitudinal and lateral position as the filter 186 received the lubricant. Moreover, with reference to FIG. 5, the inlet 190 is generally vertically higher than the outlet 192 to aid in lubricant flow.

The filtered lubricant then passes through a distribution conduit 194. In the illustrated embodiment, the distribution conduit 194 comprises a substantially downwardly extending distribution passage 196 that is connected to a substantially horizontal distribution passage 198 as shown in FIG. 5. With reference to FIG. 4, this passage 198 communicates with a passage 200 that extends into the cylinder block 32 and a secondary passage 202, which extends through a lubrication block 204, that lubricates the main bearings of crankshaft and other moving components. The lubricant then returns to the sump or oil pan under the forces of gravity.

With reference now to FIG. 5, the oil pan 166 is desirably positioned within cover 55 and cover 64 such that the final output shaft 92 is separately contained within the crankcase on a opposite side of a wall from the oil pan. Thus, the vertically extending wall 50 substantially divides the crankcase into at least two portions: one of which contains the crank chamber and the other of which contains the final output shaft 92. In this manner, the lateral dimension of the oil pan 166 may be reduced. By reducing the lateral dimension of the oil pan 166, the side-to-side movement of the lubricant contained within the oil pan 166 is substantially limited. This limited movement results in the intake 172 being positioned below the level L of lubricant within the oil pan 166 under substantially all operating conditions. As is known, when an all terrain vehicle is operating on rough terrain, lubricant can slosh within a standard sump to such a degree that air is ingested into the lubrication system. As a result of the illustrated construction, the likelihood of such ingestion is substantially reduced.

Figure 7:
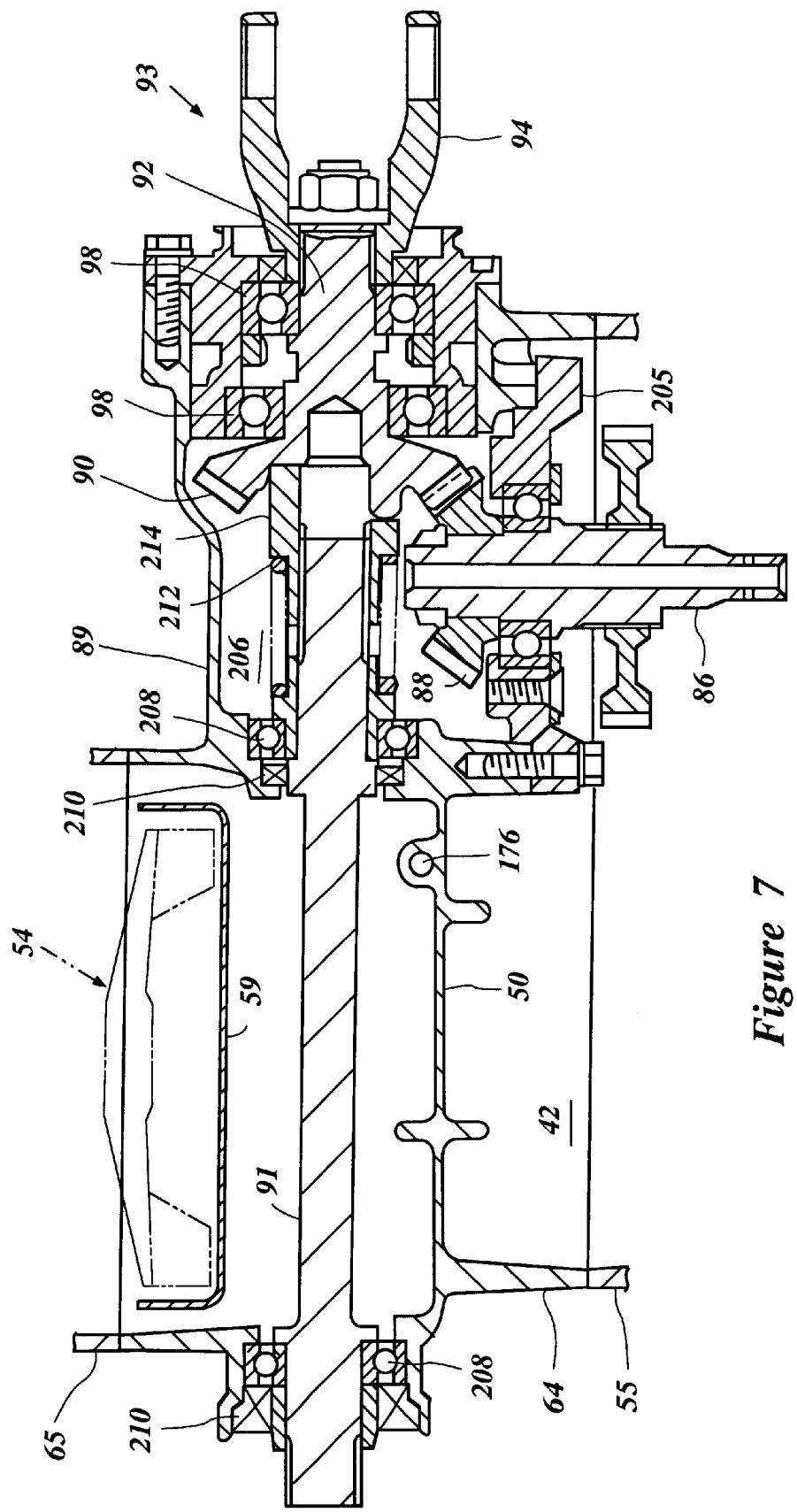
FIG. 7 is a partially sectioned view of the crankcase and the transfer case of FIG. 6 taken along the line 7—7.

With reference now to FIG. 7, the positioning and interconnections of the gear train, discussed above, that couples the v-belt transmission and shifting gear transmission to the final output shafts 92, 91 will be described. As illustrated, the third transfer shaft 86 extends through a wall 205 of the crankcase into a gear chamber 206 preferably formed within the auxiliary chamber 47 of the crankcase 42. The bevel gear 88 attached to the third transfer shaft 86 meshes with the bevel gear 90 of the final output shaft 92. The final output shaft 92 is desirably journaled for rotation about an axis 100 by a pair of bearings 98. Moreover, as described above, the final output shaft 92 carries the universal joint 94 to attach the final output shaft 92 to the driveline 54.

A front wheel final output shaft 91 also extends through the crankcase cover 64 into the gear chamber 206. As illustrated in FIG. 7, the front final output shaft 91 is journaled by a set of bearings 208. A set of seals 210 isolate the gear chamber 206 and the crankcase for foreign matter. A compression spring 212 ensures that an engaging sleeve 214 that is splined to the front final output shaft 91 remains coupled to the driven bevel gear 90 and allows a degree of relative movement to aid in coupling when desired. Thus, in the illustrated embodiment, all four wheels are capable of being dedicated to being driven. Of course, one of ordinary skill in the art will readily recognize that a variety of shifting mechanisms, including the one described in detail below, may be used to selectively engage either the front or rear drive. As illustrated, however, the gear chamber 206 is desirably distinct from the crank chamber of crankcase 42 such that the lubrication sump may be isolated from the front final output shaft 91.

Figure 8:
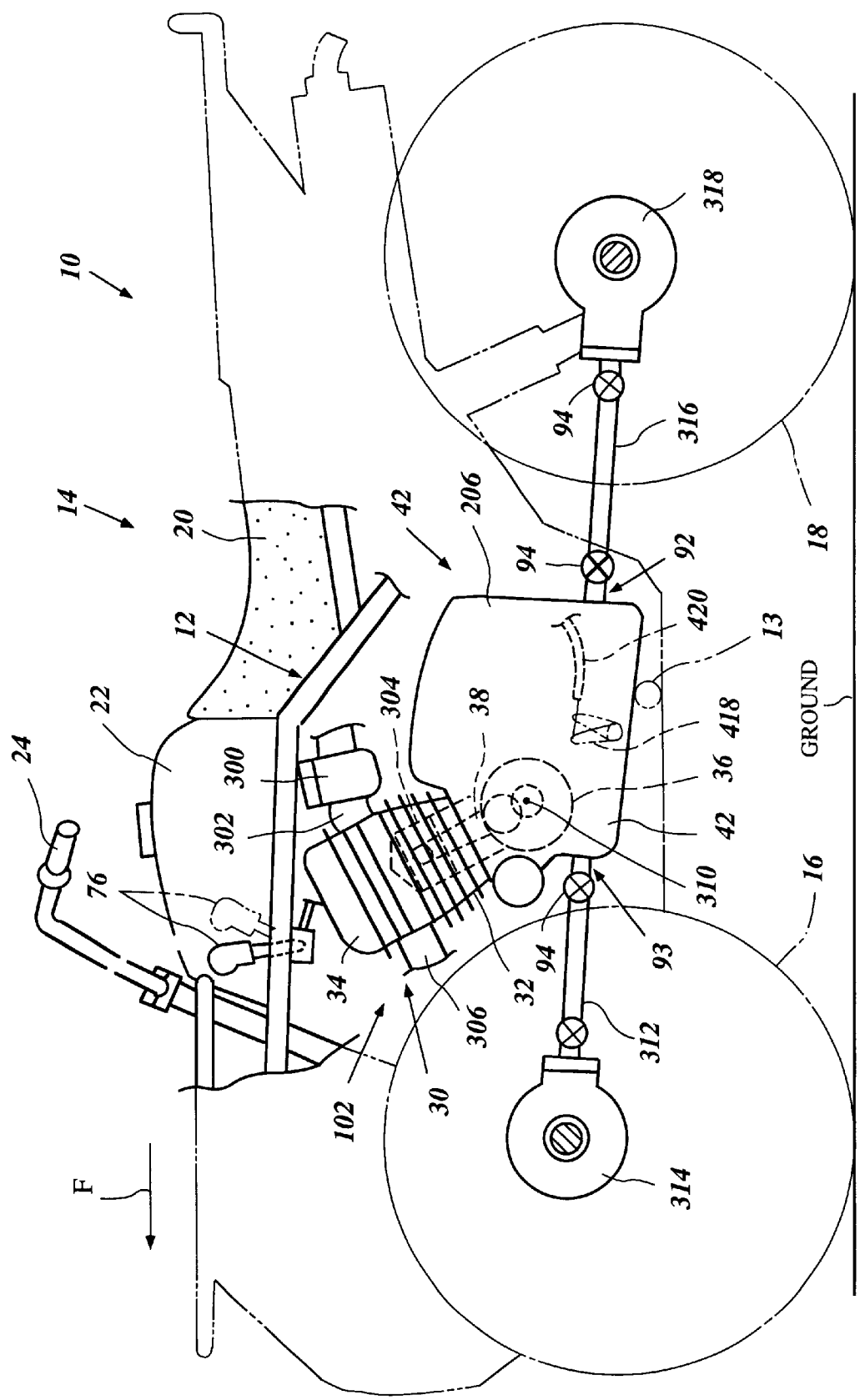
FIG. 8 is a schematic illustration of another all terrain vehicle arranged and configured in accordance with certain features, aspects and advantages of the present invention.

With reference now to FIG. 8, an all terrain vehicle having a transmission shifting arrangement in accordance with certain aspects, features and advantages of the present invention will now be described in detail. The illustrated vehicle 10 is a schematic illustration of the vehicle 10 presented above. Accordingly, like elements will be given like reference numerals unless otherwise indicated. Moreover, the above-description will apply unless otherwise indicated.

The engine 30 is preferably an internal combustion engine operating on any known operating principle and having any number of cylinders. An air fuel charge is delivered to the engine through an induction system for ignition. Specifically, a charge of air is supplied to a carburetor 300. The air charge picks up fuel within the carburetor and passes through an intake pipe 302 into a combustion chamber within the cylinder in any known manner.

A spark plug (not shown) ignites the air fuel charge in the combustion chamber. The ignition of the charge drives a piston 304 downward in a power stroke. After combustion, the exhaust gases are passed through any suitable exhaust system 306 to the atmosphere. The translation of the piston within the cylinder is transferred to the crankshaft 36 through a connecting rod 38. The crankshaft, as illustrated, desirably has a substantially laterally extending axis of rotation 310.

As described in detail above, the engine 30 selectively powers the front wheels 16, the rear wheels 18 or both through a selectively engageable transmission. The transmission engages either the front final output shaft 91 or the rear final output shaft 92 or both. The front final output shaft 91 powers the front wheels 16 through a front intermediate shaft 312 that is connected to a front differential 314. The rear final output shaft 92 powers the rear wheels 18 through a rear intermediate shaft 316 that is connected to a rear differential 318. Desirably, the differentials and intermediate shafts may be coupled in any suitable manner. While the present transmission does not utilize shiftable differentials, the connections between the differentials and the intermediate shafts are considered well known.

Figure 9:
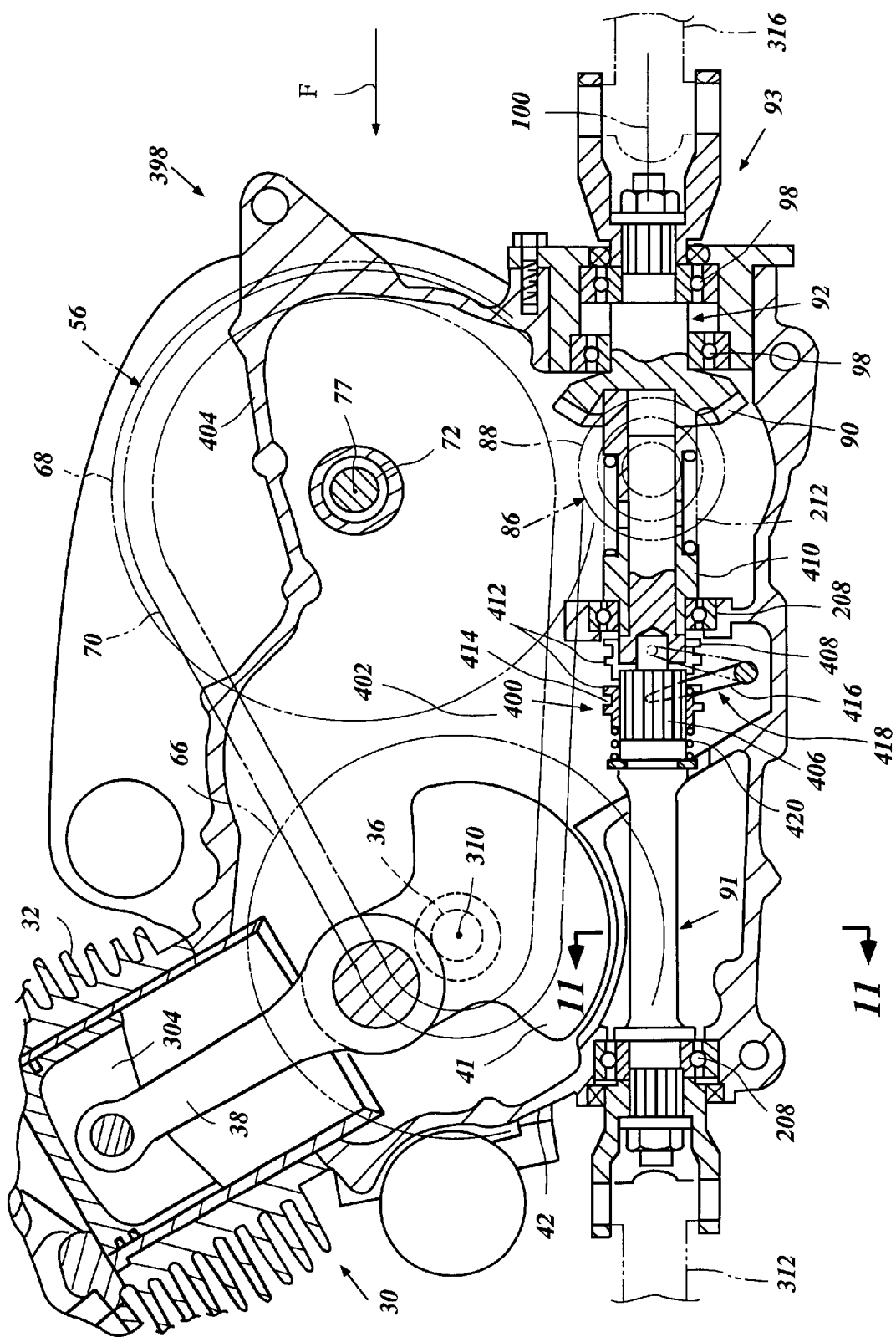
FIG. 9 is a partially sectioned view of the engine of the all terrain vehicle of FIG. 8 illustrating a two-wheel drive to four-wheel drive shifting mechanism having certain features, aspects and advantages in accordance with the present invention.

With reference now to FIG. 9, a first embodiment of a shifting apparatus for a shiftable transmission 398 having features, aspects and advantages in accordance with the present invention will be described. The illustrated drive train includes a pair of final output shafts 92, 91 that are selectively coupled to the output of the engine 30. In the illustrated embodiment, a shifting mechanism 400 is advantageously positioned within a void 402 in the crankcase 42 or transmission case 404. As illustrated, a portion of one end of the front final output shaft 91 is externally splined. The splines 406 of the shaft 91 are desirably the same size and shape as splines 408 on a stub shaft 410 that is connected to, and extends away from, the bevel gear 90.

Figure 10:
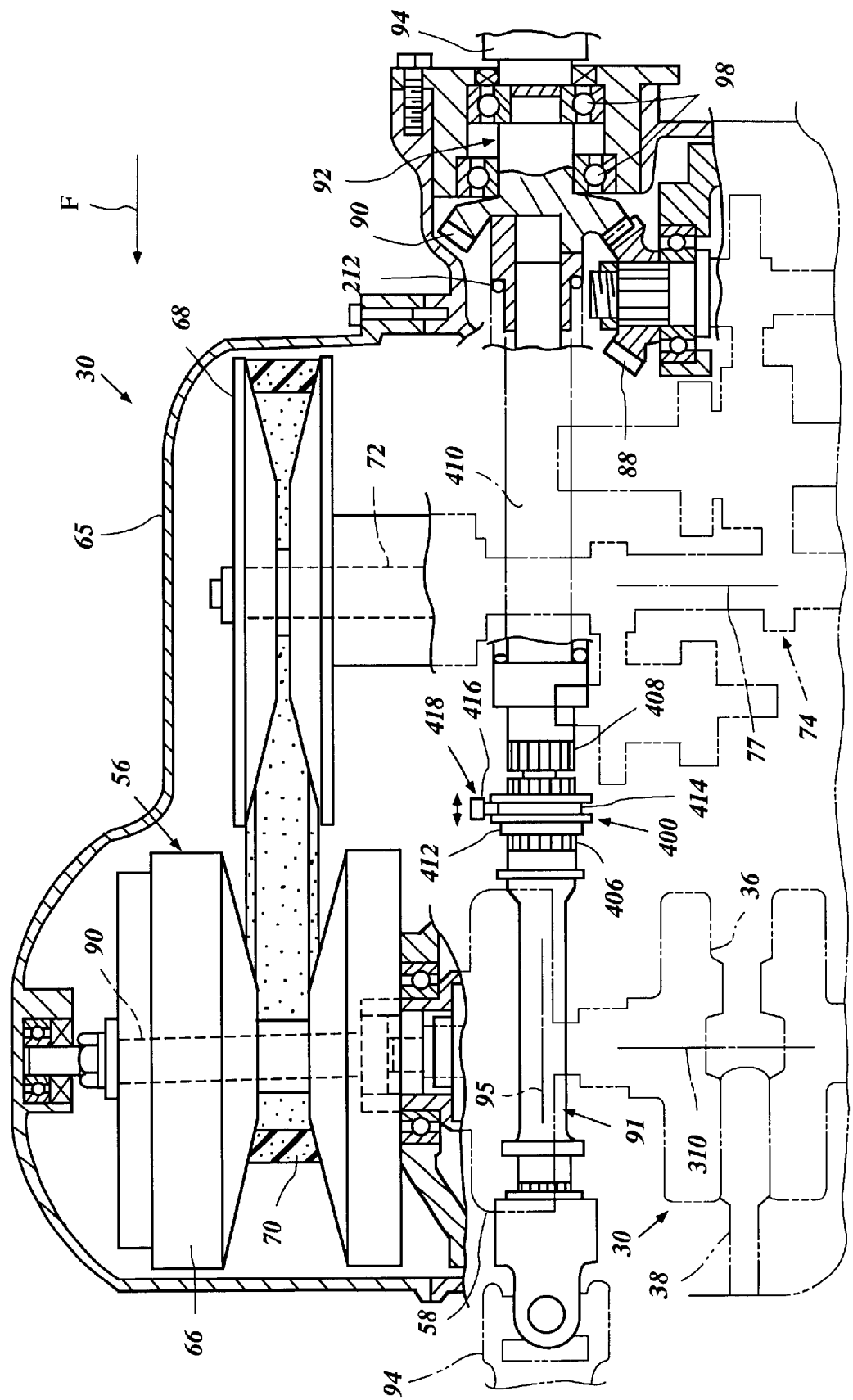
FIG. 10 is a partially sectioned view of the crankcase and the transfer case of the engine of FIG. 9.
Figure 11:
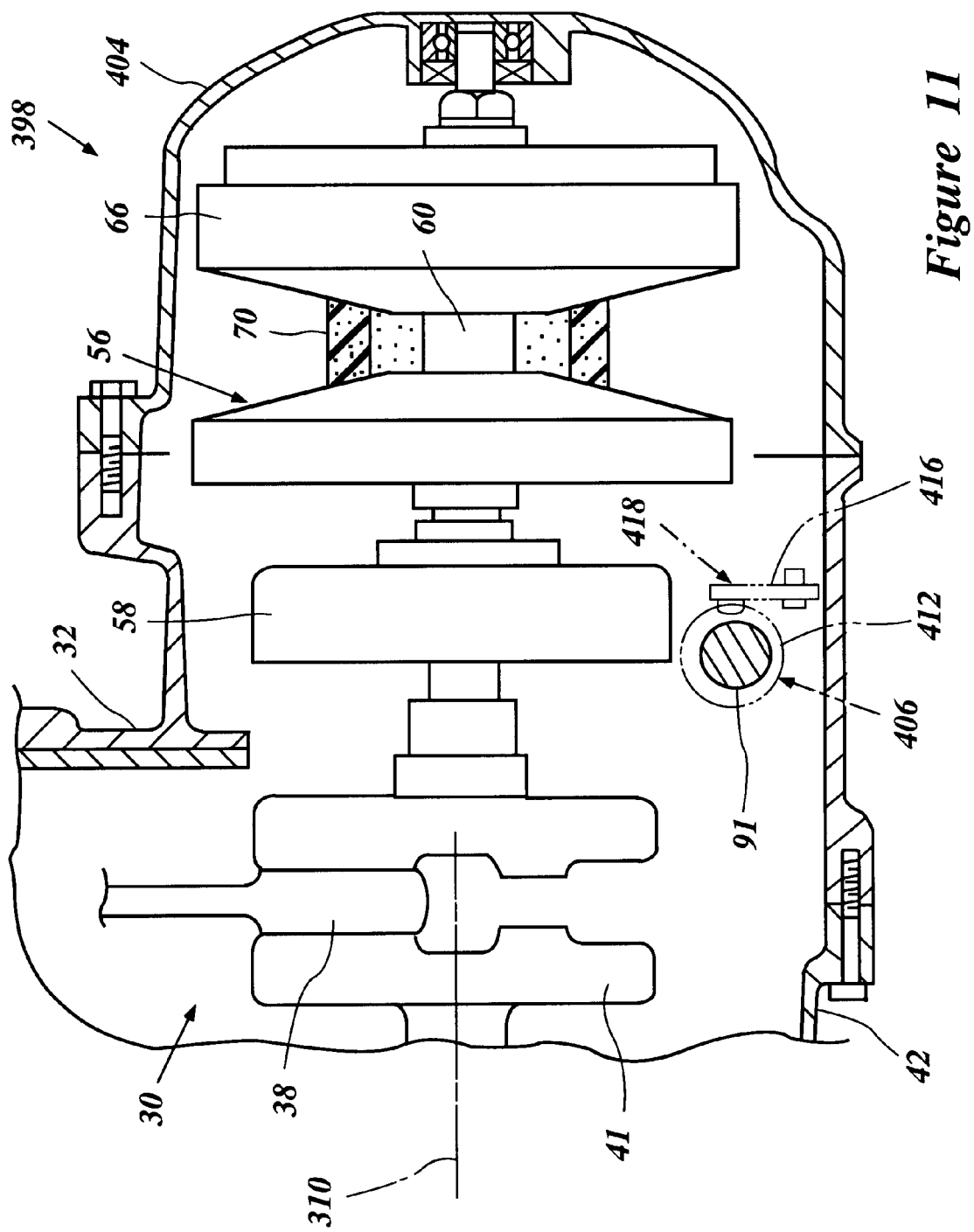
FIG. 11 is a partially sectioned view of the engine of FIG. 9 taken along the line 11—11; and, FIG. 12 is a partially sectioned view of the crankcase and the transfer case of the engine of FIG. 9 illustrating the shifting mechanism of FIG. 9.

As illustrated in FIG. 9, a slidable collar 412 is configured with internal splines (not shown) such that the collar may slide relative to both the shaft 91 and the stub shaft 410. As the collar is positioned solely on the shaft 91, the shaft 91 is disengaged from the transmission and, therefore, power is not provided to the front wheels 16. The collar may be translated rearward to couple the shaft 91 with the stub shaft 410. As the stub shaft is designed to be constantly driven by the engine output, coupling the shaft 91 to the stub shaft 410 allows the front wheels 16 to be driven by the engine 30. FIG. 10 illustrates the collar in a disengaged position while FIG. 9 illustrates an engaged position in phantom lines. It should be noted that the collar could be positioned solely on the stub shaft as well as the shaft 91, as illustrated, when disengaged.

The slidable collar 412 has an external slot 414 about its circumference defined by a pair of ridges. A lever 416 carries a pin or similar structure that can ride within the slot 414 without rotating therewith. The lever 416 and pin combination result in an actuator 418 that can control axial movement of the collar 412. It is envisioned that a plethora of other actuator's can also be designed to accomplish a similar result. For instance, a bearing surface may be axially manipulated by a linear actuator to accomplish the desired movement of the collar 412.

With reference to FIG. 8, the illustrated actuator 418 is desirably controlled by a wire 420. In one embodiment, the wire is a Bowden wire but need not be. It is anticipated that other control mechanisms, not requiring a push-pull connection can be constructed. With reference to FIG. 9, the illustrated collar 412 is biased into one position by a spring 422 such that the wire 420 need only be controlled in one direction and such that the collar will return to a first position once the tension in the wire is released. Accordingly, in the illustrated embodiment, a lockable lever, such as those known to those of ordinary skill in the art, may be used to hold the collar in either position as desired.

Figure 12:
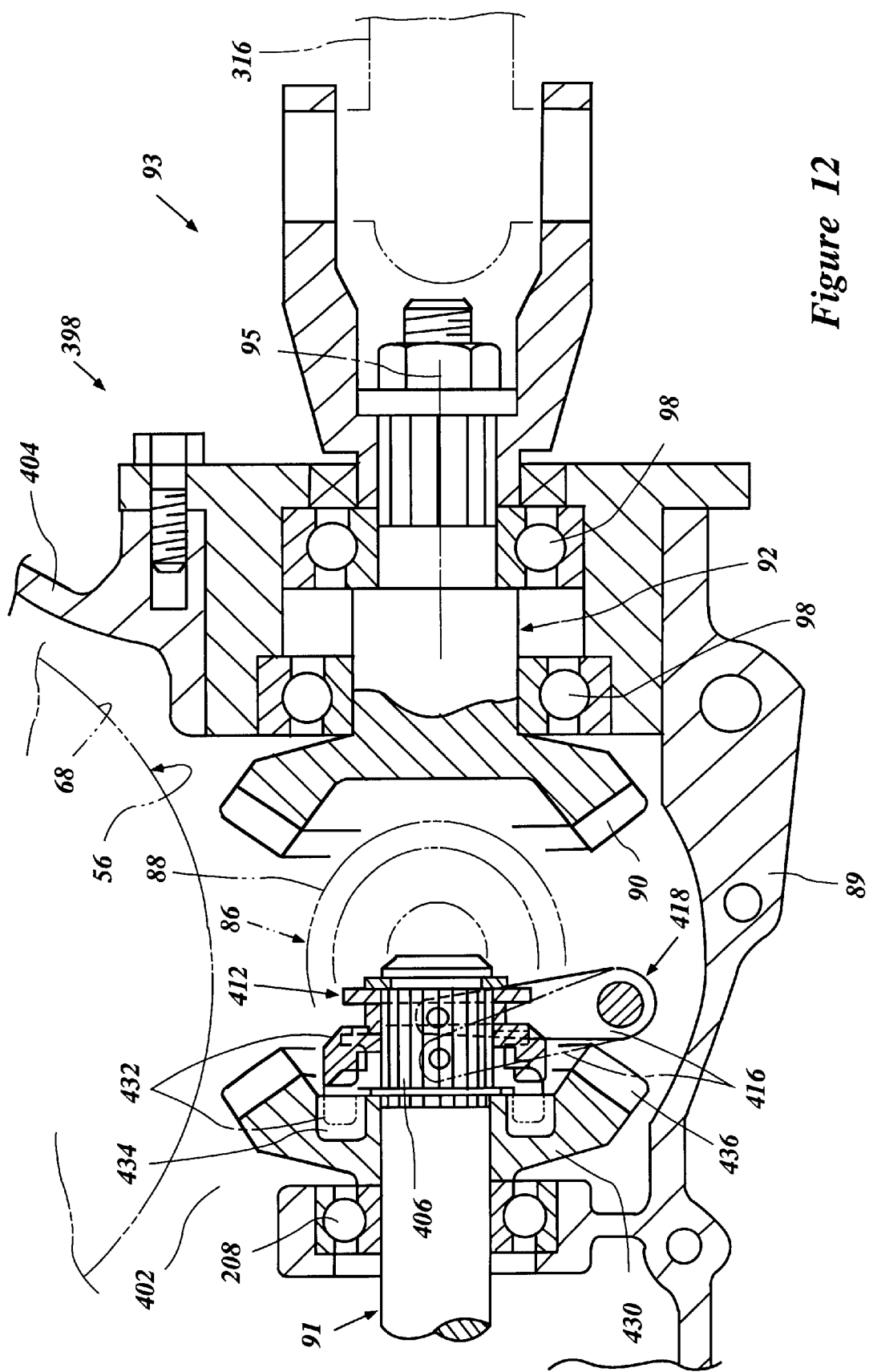

With reference now to FIG. 12, an additional embodiment of the shifting mechanism 400 is illustrated. In this mechanism, the shaft 91 is selectively coupled to a constantly driven bevel gear 430. The bevel gear 430 is engaged with the drive bevel gear 88 and is journaled for rotation by the bearing 208. The shaft 91 extends through, but is not splined to, the bevel gear 430.

A portion of the end of the illustrated shaft 91 has splines 406 that are desirably sized and configured to mate with splines on the inside of the illustrated collar 412. The collar 412 also comprises a set of substantially forward facing engaging teeth 432 that are preferably sized and configured to mesh with a set of substantially rearward facing engaging teeth 434 formed on a face of the illustrated bevel gear inside of the bevel teeth 436. As such, the teeth 432, 434 may be brought into engagement to lock the shaft 91 to the constantly driven bevel gear 430. In this manner, power from the engine may be selectively transferred to two of the four wheels. Notably, due to the use of the centrifugal clutching arrangement, the shifting is easily accomplished while the vehicle 10 is not moving. Additionally, the collar and the teeth may be reversed in some embodiments such that the collar couples with the opposite side of the bevel gear relative to the illustrated embodiment.

As will be recognized, the same actuating mechanism may be used with the embodiment illustrated in FIG. 12. Accordingly, further description of the actuating mechanism 418 is deemed unnecessary. Moreover, any other suitable actuating mechanism may be used.

Advantageously, the present shifting mechanism allows selectively two-wheel drive and four-wheel drive operation of the vehicle 10 without requiring a large shiftable differential at either the front or rear wheels of the vehicle. The construction reduces the overall weight of the vehicle as well as results in a centralization of more of the mass of the vehicle. Moreover, as the shiftable components are arranged within a void of either the crankcase or the transmission case of the vehicle, the addition of a selectable drive mechanism does not necessitate an increase in the size of the vehicle, the crankcase or the transmission case.

Although the present invention has been described in terms of a certain embodiment, other embodiments apparent to those of ordinary skill in the art also are within the scope of this invention. Thus, various changes and modifications may be made without departing from the spirit and scope of the invention. Moreover, not all of the features, aspects and advantages are necessarily required to practice the present invention. Accordingly, the scope of the present invention is intended to be defined only by the claims that follow.

What is claimed is:

1. An all terrain vehicle comprising an engine, a front wheel and a rear wheel, the engine having a generally laterally extending crankshaft, a crankcase enclosing the crankshaft, a v-belt transmission coupled to the crankshaft, the v-belt transmission comprising a driven pulley, a drive pulley and a belt extending between the driven pulley and the drive pulley, a generally vertical wall dividing the crankcase into an auxiliary chamber and a crank chamber, the v-belt transmission positioned at least partially with the auxiliary chamber, a lubricant pump positioned within the crank chamber, a final output shaft not extending through the crank chamber, the v-belt transmission positioned vertically above and connected to the final output shaft that extends longitudinally within the auxiliary chamber of the crankcase.

2. The all terrain vehicle of claim 1 farther comprising a shaft drive mechanism, the shaft drive mechanism comprising an input shaft connected to the driven pulley of the v-belt transmission and extending from the auxiliary chamber into the crank chamber through the wall and the input shaft connected to a transfer shaft that extends from the crank chamber into the auxiliary chamber.

3. The all terrain vehicle of claim 2 further comprising a sleeve extending over a portion of the final output shaft and configured such that the sleeve may translate relative to the final output shaft but cannot rotate substantially relative to the final output shaft, and a stub shaft in driving engagement with the transfer shaft, the sleeve configured to translate over a portion of the stub shaft but not to rotate relative to the stub shaft when positioned on the stub shaft, wherein the final output shaft is selectively coupleable to the stub shaft by sliding the sleeve over the portion of the stub shaft such that the sleeve joins the stub shaft and the final output shaft for rotation together.

4. The all terrain vehicle of claim 2 further comprising a transmission cover that encloses the v-belt transmission within the auxiliary chamber of the crankcase, wherein the auxiliary chamber has a cooling air inlet and a cooling air outlet.

5. The all terrain vehicle of claim 4, wherein the cooling air inlet is positioned within a crankcase wall defining a portion of the auxiliary chamber, the cooling air outlet is positioned within the transmission cover and the cooling air inlet is positioned generally forward of the cooling air outlet.

6. The all terrain vehicle of claim 1 further comprising a lubricant supply line formed within the wall and connects the lubricant pump to a lubricant filter.

7. The all terrain vehicle of claim 1 further comprising a connecting rod extending between the crankshaft and a piston of the engine, wherein a cover member defining the crankcase is divided along a generally longitudinal plane into a first portion and a second portion.

8. The all terrain vehicle of claim 7, wherein the longitudinal plane extends through the connecting rod.

9. The all terrain vehicle of claim 7 further comprising a lubricant supply line and a lubricant filter, the lubricant supply line extending between the lubricant pump and the lubricant filter, wherein the wall extends through the first portion of the crankcase, the lubricant filter is attached to the lubricant system through a sidewall of the first portion of the crankcase and the second portion of the crankcase has a recess positioned in an upper surface proximate the lubricant filter.

10. The all terrain vehicle of claim 9, wherein the lubrication filter is positioned longitudinally at a location between the drive pulley and the driven pulley of the v-belt transmission.

11. The all terrain vehicle of claim 9, wherein the lubricant supply line extends generally upward within the wall at a longitudinal position generally between the drive pulley and the driven pulley.

12. The all terrain vehicle of claim 1 further comprising a clutch chamber defined proximate the drive pulley and segregated from the auxiliary chamber and the crank chamber, wherein the clutch chamber houses a centrifugal clutch interposed between the crankshaft and the v-belt transmission.

13. The all terrain vehicle of claim 12, wherein the final output shaft extends through the crankcase within the auxiliary chamber at a location vertically below a lowermost portion of the clutch chamber.

14. An all terrain vehicle comprising a frame, an engine, at least one front wheel and at least one rear wheel attached to the frame, the engine having a generally laterally extending crankshaft, a crankcase enclosing the crankshaft, a generally vertical wall dividing the crankcase into an auxiliary chamber and a crank chamber, a gear box defined within a portion of the auxiliary chamber, a lubricant pump positioned within the crank chamber, a shaft drive mechanism comprising an input shaft connected to the crankshaft and a transfer shaft extending from within the crank chamber into the gear box, a first final output shaft coupled to the transfer shaft and a second final output shaft selectively coupleable to the transfer shaft, a shiftable coupling mechanism positioned between the second final output shaft and the transfer shaft and located at least partially within the crankcase and capable of shifting to drive one of the front wheel or the rear wheel or to drive both the front wheel and the rear wheel.

15. The all terrain vehicle of claim 14, wherein the shiftable coupling mechanism is positioned within the gear box.

16. The all terrain vehicle of claim 14, wherein the input shaft of the shaft drive mechanism is connected to the crankshaft through a v-belt transmission, the v-belt transmission comprising a driven pulley, a drive pulley and a belt extending between the driven pulley and the drive pulley, the driven pulley being connected to the input shaft of the shaft drive mechanism, the v-belt transmission positioned at least partially within the auxiliary chamber and the shiftable coupling mechanism located longitudinally between the crankshaft and the input shaft of the shaft drive mechanism.

17. The all terrain vehicle of claim 14, wherein the transfer shaft of the shaft drive mechanism carries an output bevel gear positioned within the gear box, the first final output shaft carries a first input bevel gear positioned within the gear box, the first input bevel gear in driving engagement with the output bevel gear and in selective driving engagement with the second final output shaft.

18. The all terrain vehicle of claim 17, wherein the first final output shaft is capable of transmitting rotational power to the rear wheel.

19. The all terrain vehicle of claim 14, wherein the transfer shaft of the shaft drive mechanism carries an output bevel gear positioned within the gear box, the first final output shaft carries a first input bevel gear positioned within the gear box, the second final output shaft carries a second input bevel gear positioned within the gear box, the first input bevel and the second input bevel gear in constant driving engagement with the output bevel gear, the first input bevel gear in constant driving engagement with the first final output shaft and the second input bevel gear in selective driving engagement with the second final output shaft.

20. The all terrain vehicle of claim 19, wherein the second final output shaft is capable of transmitting power to the front wheel.

21. The all terrain vehicle of claim 19, wherein the second bevel gear has a face, a first plurality of engaging teeth are formed on the face, a second plurality of complementary engaging teeth are formed on a sleeve, the sleeve is arranged to allow relative sliding movement between the sleeve and the second final output shaft but not to allow relative rotational movement between the sleeve and the second final output shaft, the sleeve is selectively translated to register the first plurality of teeth and the second plurality of teeth such that the second final output shaft is engaged for rotation with the second bevel gear.

22. An all terrain vehicle comprising a frame, an engine, at least one front wheel and at least one rear wheel attached to the frame, the engine having a generally laterally extending crankshaft, a first housing enclosing at least a portion of the crankshaft, the crankshaft driving a belt drive, the belt drive positioned between a portion of the housing and a transmission cover, a generally vertical wall dividing the housing into an auxiliary chamber and a crank chamber, the Rex auxiliary chamber generally defined by the housing, the generally vertical wall and the transmission cover, a lubricant pump positioned within the crank chamber, at least one oil passage extending through a portion of the generally vertical wall and being fluidly connected to the lubricant pump, a lubricant filter connected to the at least one oil passage and supported by the generally vertical wall.

23. The vehicle of claim 22 further comprising a flywheel magneto that is driven by the crankshaft, the flywheel magneto being partially enclosed by a flywheel cover, the flywheel cover being connected to an opposite lateral side of the housing from the transmission cover, and the lubricant filter being disposed rearwardly of the flywheel cover.

24. The vehicle of claim 23, wherein the flywheel cover extends laterally outward from the housing further than an outermost portion of the lubricant filter.

25. The vehicle of claim 22 wherein the engine comprises a piston that is connected to the crankshaft with a connecting rod, the housing being split into a right portion and a left portion in a longitudinal direction generally at a location that is aligned with the connecting rod, the left portion having a reduced vertical profile relative to the right portion such that the lubricant filter can be supported by the generally vertical wall and positioned generally above the left portion.

26. The vehicle of claim 25, wherein the left portion extends laterally outward from the right portion further than an outermost portion of the lubricant filter.

27. The vehicle of claim 22, wherein the lubricant pump is mounted to the generally vertical wall.

28. The vehicle of claim 22 further comprising a coolant pump, the lubricant pump being driven by a transfer shaft and the coolant pump being driven by the same transfer shaft, the lubricant filter being positioned higher than the coolant pump.

29. An all terrain vehicle comprising an engine, a front wheel and a rear wheel, the engine having a generally laterally extending crankshaft, a crankcase enclosing the crankshaft, a v-belt transmission coupled to the crankshaft, the v-belt transmission comprising a driven pulley, a drive pulley and a belt extending between the driven pulley and the drive pulley, a generally vertical wall dividing an auxiliary chamber from an oil reservoir, the oil reservoir being in fluid communication with said crankcase, the v-belt transmission positioned generally within the auxiliary chamber, a final output shaft extending longitudinally within the auxiliary chamber and being positioned outside of said oil reservoir.

30. The vehicle of claim 29 further comprising a lubricant pump positioned within the crankcase, said lubricant pump communicating with said oil reservoir and being capable of supplying lubricant to said engine.

31. The vehicle of claim 30 further comprising a shaft drive mechanism, the shaft drive mechanism comprising an input shaft connected to the driven pulley of the v-belt transmission and extending from the auxiliary chamber into the crankcase through the wall, the input shaft being connected to a transfer shaft that extends from the crank chamber into the auxiliary chamber and the transfer shaft being connected to the final output shaft at a location within the auxiliary chamber.

32. The vehicle of claim 31, wherein the auxiliary chamber further comprises a cooling air inlet and a cooling air outlet.

33. The vehicle of claim 32, wherein the cooling air inlet is positioned within a crankcase wall defining a portion of the auxiliary chamber, the cooling air outlet is positioned within the transmission cover and the cooling air inlet is positioned generally forward of the cooling air outlet.

\* \* \* \* \*

UNITED STATES PATENT AND TRADEMARK OFFICE
CERTIFICATE OF CORRECTION

PATENT NO.    : 6,454,040 B1  
DATED         : September 24, 2002  
INVENTOR(S)   : Kazutaka Fukuda It is certified that error appears in the above-identified patent and that said Letters Patent is hereby corrected as shown below:

<u>Column 12,</u>
Line 61, please delete "farther" and insert therefore -- further --

Signed and Sealed this

Thirtieth Day of September, 2003

JAMES E. ROGAN  
*Director of the United States Patent and Trademark Office*